UNITED STATES PATENT OFFICE.

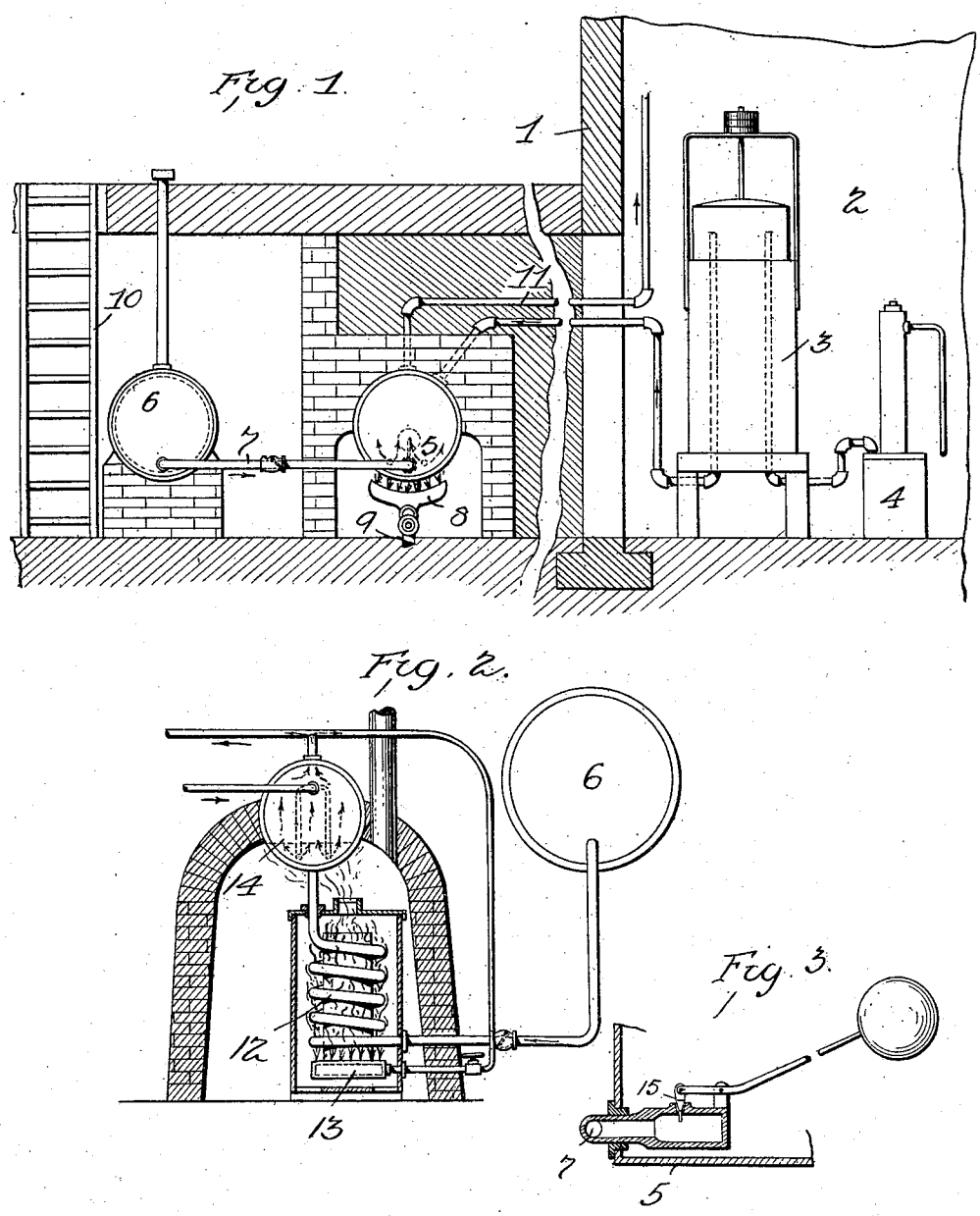

SEYMOUR W. PEREGRINE, OF PORTLAND, MAINE.

CARBURETING PLANT.

No. 906,276.   Specification of Letters Patent.   Patented Dec. 8, 1908.

Application filed January 19, 1907, Serial No. 353,159. Renewed November 6, 1908. Serial No. 461,384.

*To all whom it may concern:*

Be it known that I, SEYMOUR W. PEREGRINE, a citizen of the United States, residing at Portland, Maine, have invented certain new and useful Improvements in Carbureting Plants, of which the following is a specification.

My invention relates to carbureting plants for furnishing light and fuel to dwellings and other buildings and my object is to provide a plant in which low-grade oil may be employed. Such oil in order to be evaporated requires extreme heat and in order to insure safety in the operation of the plant, I provide means for heating the oil outside the building and under ground.

The invention consists in the features and combination and arrangement of parts hereinafter described and particularly pointed out in the claims.

In the accompanying drawing is shown in Figure 1 a view of my improved apparatus adapted for use in supplying fuel gas to a building this being the principal use to which the gas from low grade oil is put. Fig. 2 is a view of a modified form of evaporator and oil heater. Fig. 3 is a view of a detail.

In these drawings 1 represents the wall of the building and 2 the cellar thereof in which is located the air compressor 4, and the aerometer 3. The air is conveyed from this aerometer or governor to the evaporator and carbureter 5. This carbureter is supplied with oil from a tank 6 arranged under ground, forming a supply chamber connected by a pipe to an automatic valve in the carbureter. The supply tank containing a quantity of oil is connected with the carbureter 5 by a pipe 7 and to this carbureter the air is led from the aerometer. This carbureter is heated by the direct action of a burner 8 to which gas is supplied through any suitable branch pipe as 9. The carbureter and its direct heating apparatus are located under ground to insure safety and they are located in any suitable vault or chamber to which access may be had by a ladder 10 or otherwise from a point outside of the building. From this carbureter the gas is conducted through a gas main 11 leading into the building. The evaporator or carbureter may be bricked in as shown.

Instead of the form of carbureter shown in Fig. 1, I may employ that shown in Fig. 2, the main difference being the use of the coil 12 which is heated by the burner 13 and from which the vaporized oil passes into the chamber 14 to which the air is fed, all the other features being the same as above described.

In Fig. 3 I show at 15 a detail of the float operated valve used in the carbureter 5, so that only a limited quantity of oil is permitted to enter the said carbureter from the storage tank 6.

I claim as my invention:

1. In combination in a plant for supplying buildings with carbureted air, a carbureting tank placed under ground outside the building, a controlled air supply to said tank leading without the building, a heating device for the oil supply to the said carbureting tank, said device consisting of a coil through which the oil passes, and means for heating the said coil, said heating device being also arranged underground outside the building, and a distributing pipe extending from the carbureting tank to the inside of the building.

2. In combination in a carbureting plant, a carbureting chamber, a supply tank connected therewith, means for supplying air to the carbureting chamber and means for directly heating the oil at the carbureter comprising a coil located adjacent the carbureter and in the connection leading from the supply tank, a burner for heating the coil, the said burner also supplying heat to the carbureter chamber.

In testimony whereof, I affix my signature in presence of two witnesses.

SEYMOUR W. PEREGRINE.

Witnesses:
   W. R. ANTHOINE,
   THOMAS L. TALBOT.